(12) United States Patent
Sirco et al.

(10) Patent No.: US 11,560,917 B1
(45) Date of Patent: Jan. 24, 2023

(54) MOUNTING ARRANGEMENTS FOR POOL FITTINGS AND METHODS FOR MOUNTING POOL FITTINGS

(71) Applicant: LATHAM POOL PRODUCTS, INC., Latham, NY (US)

(72) Inventors: Collin J. Sirco, Ballston Lake, NY (US); Stephen E. Deeb, Glenmont, NY (US); Kyle Robert-Shaw Tice, Grand Rapids, MI (US)

(73) Assignee: Latham Pool Products, Inc., Latham, NY (US)

( * ) Notice: Subject to any disclaimer, the term of this patent is extended or adjusted under 35 U.S.C. 154(b) by 312 days.

(21) Appl. No.: 16/809,807

(22) Filed: Mar. 5, 2020

(51) Int. Cl.
*E04H 4/00* (2006.01)
*E04H 4/14* (2006.01)
*F16B 37/08* (2006.01)
*F16B 43/00* (2006.01)

(52) U.S. Cl.
CPC ....... *F16B 37/0807* (2013.01); *E04H 4/0043* (2013.01); *E04H 4/14* (2013.01); *F16B 43/00* (2013.01)

(58) Field of Classification Search
CPC ........... E04H 4/12; E04H 4/169; E04H 4/148; E04H 4/0043; E04H 4/14; A61H 33/6063
USPC ................................ 4/492, 507, 541.1, 541.6
See application file for complete search history.

(56) References Cited

U.S. PATENT DOCUMENTS

| | | | |
|---|---|---|---|
| 4,561,134 A * | 12/1985 | Mathews | E04H 4/12 4/496 |
| 4,613,169 A * | 9/1986 | Engelhart | F16L 41/14 277/606 |
| 4,951,326 A | 8/1990 | Barnes et al. | |
| 5,040,250 A | 8/1991 | Barnes et al. | |
| 5,207,499 A | 5/1993 | Vajda et al. | |
| 5,392,473 A * | 2/1995 | Idland | E03C 1/048 4/541.3 |
| 5,881,401 A | 3/1999 | Saputo | |
| 6,578,207 B1 * | 6/2003 | Fratilla | B05B 15/654 4/492 |
| 6,702,451 B1 * | 3/2004 | Daane | A61H 33/6063 362/240 |
| 7,014,753 B2 | 3/2006 | Holstein et al. | |
| 8,079,726 B1 | 12/2011 | Hui et al. | |
| 8,281,462 B2 | 10/2012 | Hui | |

(Continued)

OTHER PUBLICATIONS

Radiant Pools, "Installation Manual: Metric Series Residential Swimming Pool," 2006, 12 pp.

*Primary Examiner* — Christine J Skubinna
(74) *Attorney, Agent, or Firm* — Kilpatrick Townsend & Stockton LLP

(57) ABSTRACT

Arrangements for mounting pool fittings and methods for mounting pool fittings, for example, return fittings, to pool walls are provided. The arrangements and methods facilitate the installation and maintenance of pool fittings by preventing the undesirable rotation of the fitting during installation or maintenance. Aspects of the invention are characterized by mounting plates having one or more projections or recesses that engage one or more projections or recesses on the pool fitting to restrict rotation of the fitting. Mounting plates having one or more restricting projections or recesses are also disclosed. Aspects of the invention are not limited to return fittings, but can be adapted for use with any structure mounted to a pool wall, for example, to an insulated pool wall.

23 Claims, 10 Drawing Sheets

(56) References Cited

U.S. PATENT DOCUMENTS

| | | |
|---|---|---|
| 8,905,625 B2 | 12/2014 | Hartman et al. |
| 9,410,337 B1 * | 8/2016 | Wall .......................... E04H 4/12 |
| 9,844,488 B2 | 12/2017 | Afshar |
| 10,053,882 B2 | 8/2018 | Goettl |
| 10,081,858 B2 | 9/2018 | Thompson |
| 10,246,893 B2 | 4/2019 | Thompson |
| 10,244,490 B2 | 7/2019 | Foster et al. |
| 10,597,885 B2 | 3/2020 | Goettl |
| 10,744,544 B2 | 9/2020 | Foster et al. |
| 2008/0104745 A1 | 5/2008 | Beaudoin et al. |
| 2009/0165283 A1 * | 7/2009 | Edris .................... A61H 33/027 |
| | | 29/525.01 |
| 2019/0217230 A1 * | 7/2019 | Hales .................... B01D 29/15 |

\* cited by examiner

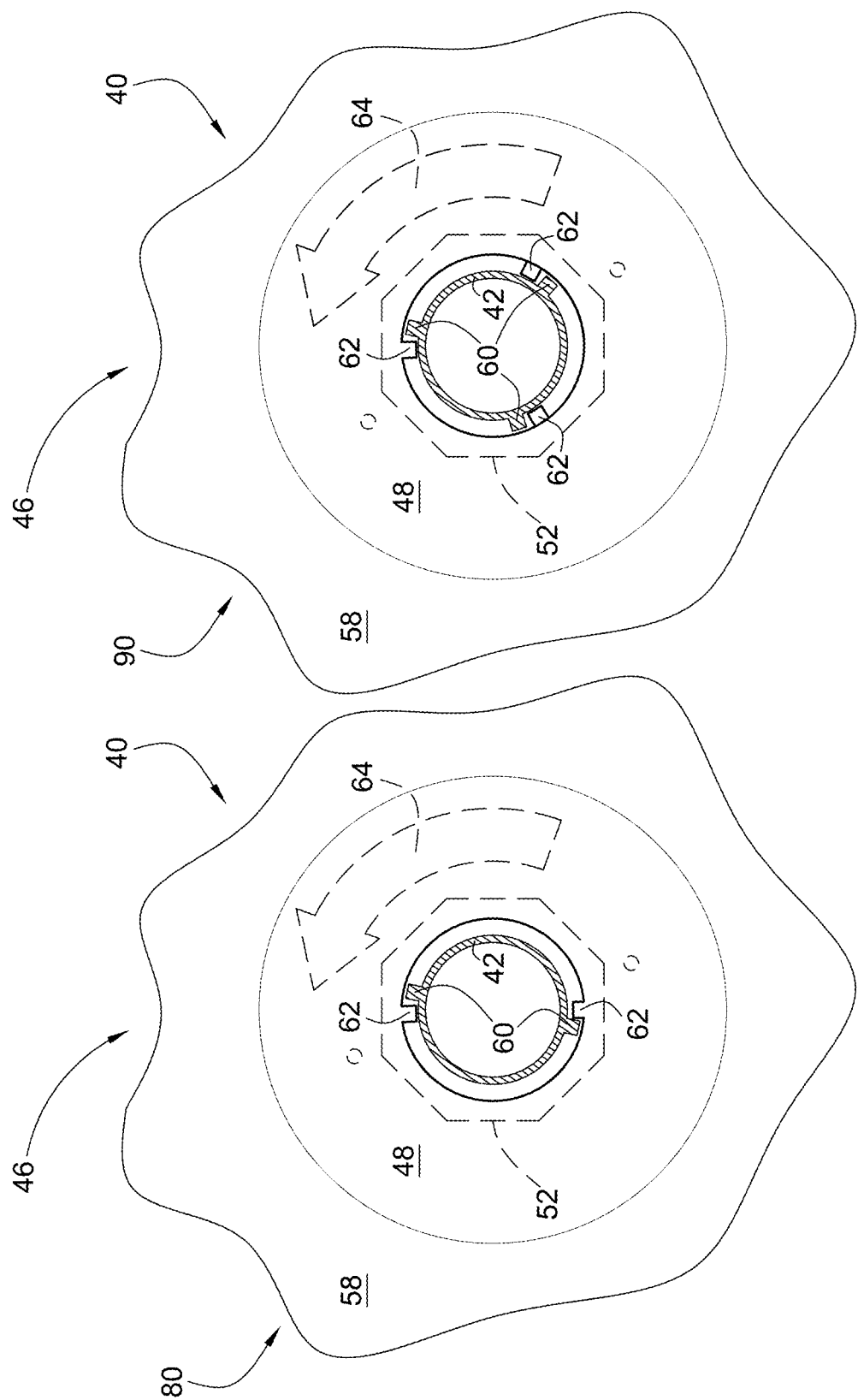

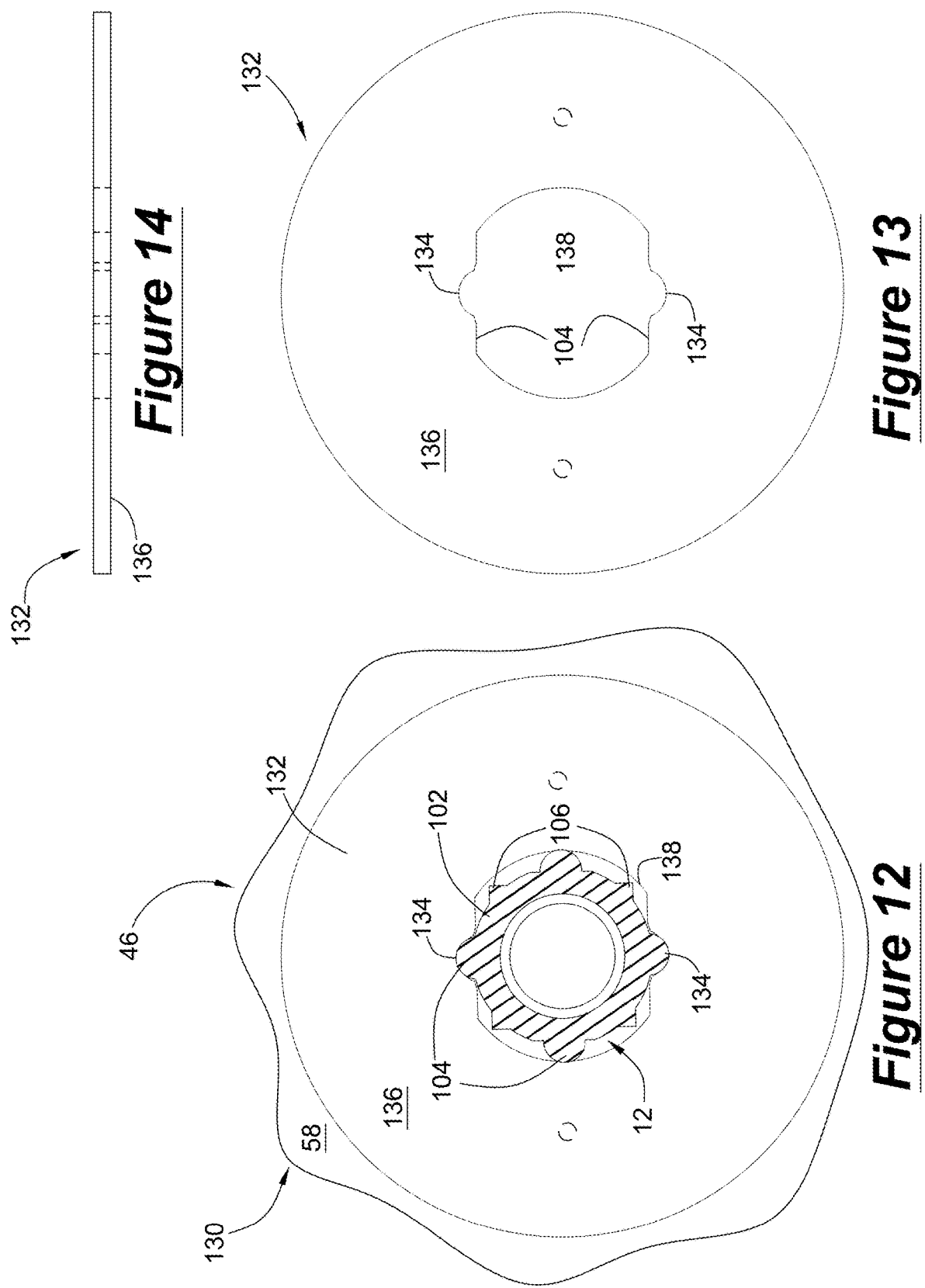

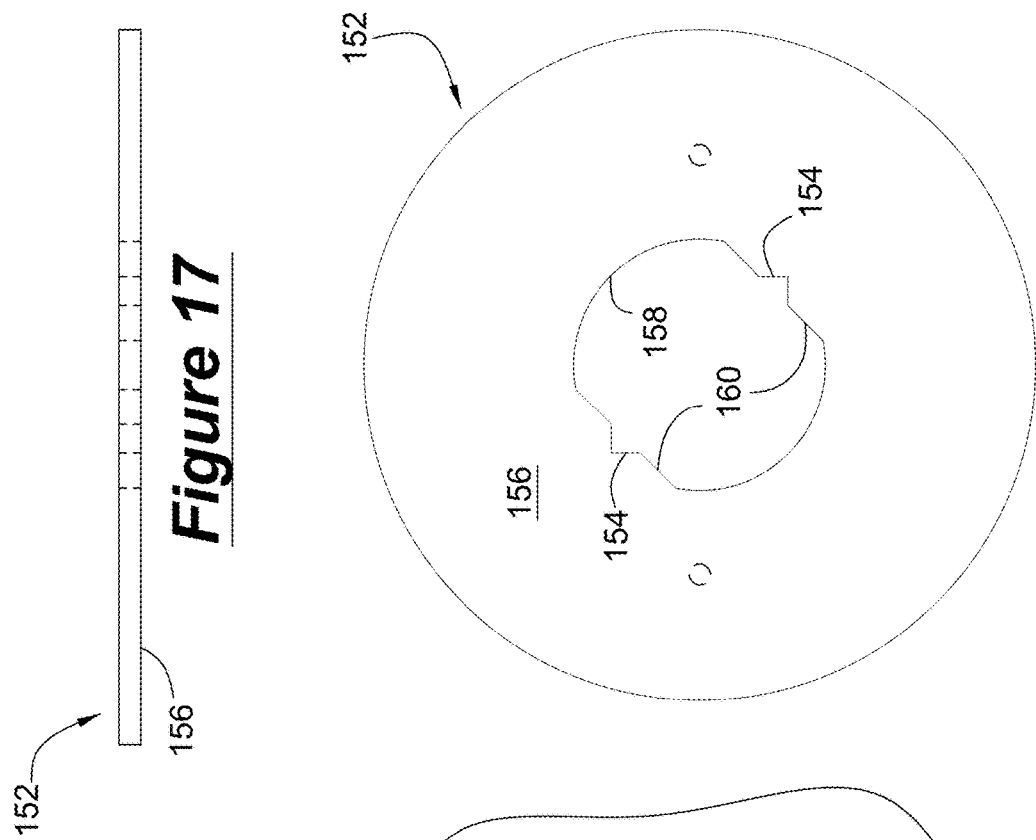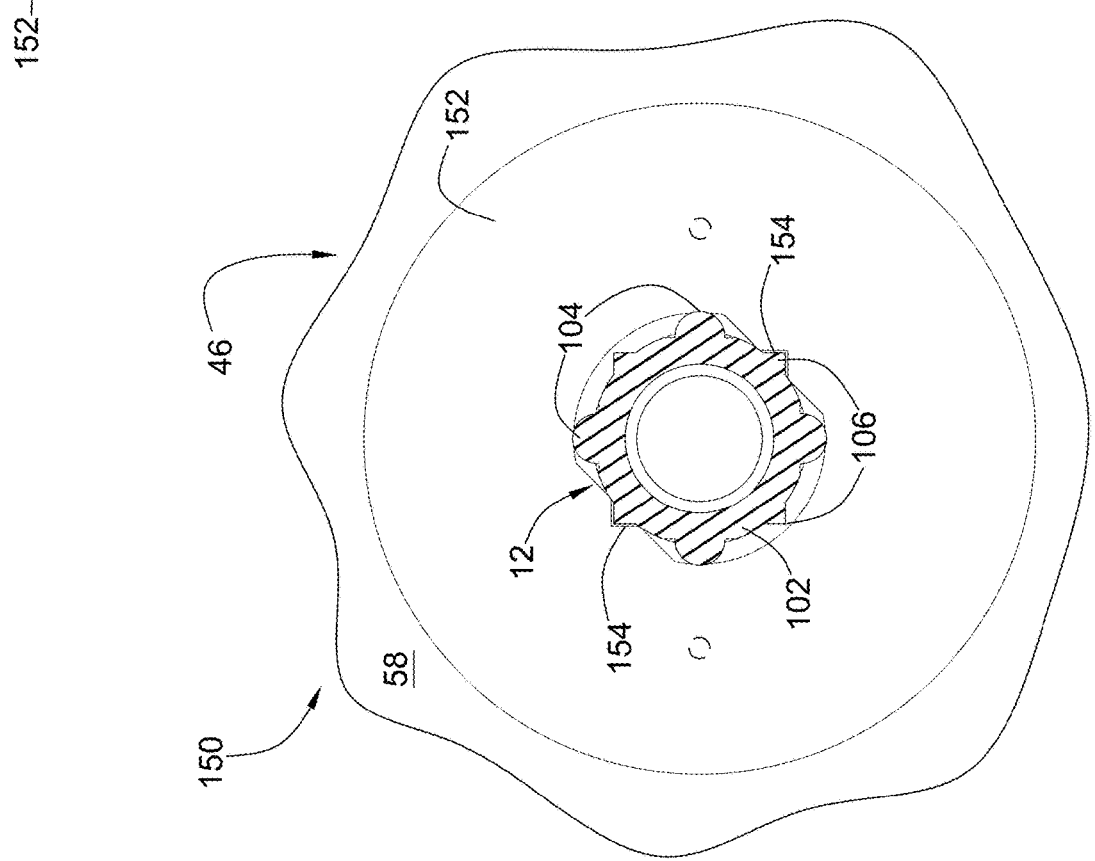

MOUNTING ARRANGEMENTS FOR POOL FITTINGS AND METHODS FOR MOUNTING POOL FITTINGS

BACKGROUND OF THE INVENTION

Technical Field

The present invention generally relates to mounting of swimming pool fittings. More particularly, the present invention relates to the mounting of swimming pool fittings with mounting plates that restrict rotation of the fitting, such as, return fittings, to facilitate installation and maintenance.

Description of Related Art

Swimming pools typically include piping systems to withdraw and recirculate pool water for various reasons, including for filtration; treatment with disinfectants, such as, with chlorine-containing chemicals; or for heating, among other reasons. These piping systems typically extract water from one location, for example, at a drain or skimmer assembly, and after treatment return the treated water to the pool. The introduction of the treated water is typically practiced using a fitting or inlet to which the treated water is fed. One such fitting used in the art to re-introduced treated water to the pool is referred to as a "return fitting."

Return fittings are typically mounted to the wall of a pool through a penetration or hole in the wall. The return fitting is mounted into the hole in the pool wall and then treated water is piped to the return fitting for reintroduction to the pool. Return fittings may typically include some form of orificing or directional baffles to regulate or direct the flow of water into the pool as desired.

Though various return fittings are known in the art for use in typical above ground pool wall structures and inground pool wall structures, insulated pool walls require longer fittings due to the relatively greater width of the insulated pool wall. A typical insulated pool wall structure is provided by Trojan Leisure Products, LLC (doing business as "Radiant Pools") of Albany, N.Y., and is disclosed in U.S. Patent Publication 2008/0104745 of Beaudoin, et al. and in U.S. Pat. No. 10,244,490 of Foster, et al.

Though these and like insulated pool structure have been commercially successful, the present inventors have found that the installation of return fittings to such insulated pool walls can be improved and, for example, made easier. Aspects of the present invention provide mounting arrangements and methods that facilitate the installation and maintenance of pool fittings, such as, return fittings.

SUMMARY OF THE INVENTION

Aspects of the present invention provide mounting arrangements for pool fittings, methods of mounting pool fittings, and pool fitting mounting plates that facilitate the installation and maintenance of pool fittings, especially for fittings mounted in insulted pool walls. Aspects of the invention are characterized by fitting mounting plates having projections or recesses that interact with projections or recesses on pool fittings and restrict the rotation of the fitting during installation and to thus ensure a secure mounting in a desired orientation.

One embodiment of the invention is a mounting arrangement for a pool fitting, the mounting arrangement comprising or including: a pool fitting adapted to penetrate a wall of a pool, the pool fitting having a cylindrical body having an external thread, a proximal end having a mounting flange having an outside dimension greater than an outside dimension of the cylindrical body, at least one projection from the cylindrical body, and a distal end providing access to the external thread on the cylindrical body; a mounting plate having a through hole sized and positioned to receive the cylindrical body of the pool fitting and at least one projection or recess adapted to engage the at least one projection from the cylindrical body; and an internally threaded nut adapted to engage the external threads of the distal end of the cylindrical body; wherein contact between the at least one projection on the cylindrical body of the fitting with the at least one projection or recess of the mounting plate restricts rotation of the pool fitting with respect to the mounting plate. In one aspect, the pool fitting may be of a nozzle, a light fixture, an inlet, and an outlet. In one aspect, the pool fitting may be a return fitting.

In one aspect, the at least one projection from the cylindrical body of the fitting is positioned adjacent the mounting flange of the fitting.

In another aspect, contact between the at least one projection on the cylindrical body of the fitting with the at least one projection or recess of the mounting plate prevents rotation of the pool fitting with respect to the mounting plate.

In another aspect, the cylindrical body of the fitting may be cylindrical, for example, circular cylindrical.

In another aspect, the pool wall comprises an insulated pool wall, for example, having opposing external sheeting and an internal insulating foam.

In another aspect, the arrangement further comprises at least one fastener adapted to retain the mounting plate to the pool wall.

In another aspect, the mounting plate may comprise an internal mounting plate, and the arrangement may include an external mounting plate having a through hole sized and positioned to receive the cylindrical body of the pool fitting.

Another embodiment of the invention is a pool fitting mounting device comprising, consisting of, or including a plate having a through hole sized and positioned to receive a cylindrical body of a pool fitting, the plate having at least one projection or recess adapted to engage at least one projection from the cylindrical body and prevents rotation of the pool fitting with respect to the plate. In one aspect, the pool fitting mounted by the mounting device may be a return fitting.

In one aspect, the at least one projection or recess comprises at least one radially directed projection or recess.

In one aspect, the plate may be a circular plate or a non-circular plate, such as, a rectangular plate.

In one aspect, the at least one projection or recess may comprise a plurality of projections or recesses, for example, 2, 3, or 4 projections or recesses.

A further embodiment of the invention is a method for mounting a fitting to a pool wall having a through hole, the method comprising or including: positioning a mounting plate about the through hole in the pool wall, the mounting plate having a through hole sized and positioned to receive a cylindrical body of a pool fitting, the through hole in the mounting plate having at least one projection or recess; inserting a cylindrical body of a pool fitting through the through hole in the mounting plate and through the through hole in the pool wall, the cylindrical body having an external thread, a proximal end having a mounting flange having an outside dimension greater than an outside dimension of the through hole in the mounting plate, and at least one projection from the cylindrical body; mounting an internally threaded nut to the external thread of the cylindrical body of the fitting and rotating and advancing the nut toward the pool wall; and while advancing the nut, contacting the at least one projection from the cylindrical body of the fitting with the at least one projection or recess from the mounting plate to restrict rotation of the fitting with respect to the mounting plate.

In one aspect, securing the mounting plate to the pool wall with at least one mechanical fastener or an adhesive may practice positioning the mounting plate.

In one aspect, contacting the at least one projection from the cylindrical body of the fitting with the at least one projection or recess from the mounting plate comprises preventing rotation of the fitting with respect to the mounting plate.

A further embodiment of the invention is a pool fitting mounting plate having a through hole, for example, a central through hole, sized and positioned to receive a pool fitting and at least one projection or recess adapted to engage at least one projection or recess on the pool fitting, for example, a pool return fitting. In one aspect, the through hole of the pool fitting mounting plate may have an internal surface, and the at least one projection or recess of the mounting plate may be located on the internal surface of the through hole. In one aspect, the pool fitting may comprise a cylindrical body, and the at least one projection or recess on the pool fitting may be positioned on the cylindrical body of the pool fitting, for example, on the outer surface of the cylindrical body of the pool fitting. In another aspect, the pool fitting mounting plate may have a ring, boss, or projection about the through hole, and the at least one projection or recess of the mounting plate may be located on an internal surface of the ring, boss, or projection. In one aspect, contact between the at least one projection or recess of the mounting plate and the at least one projection or recess on the fitting may prevent rotation of the pool fitting with respect to the mounting plate, for example, during installation on and/or removal from an insulated pool panel.

These and other aspects, features, and advantages of this invention will become apparent from the following detailed description of the various aspects of the invention taken in conjunction with the accompanying drawings

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings, in which:

FIG. 5 is a section view similar to FIG. 4 of another pool fitting mounting arrangement according to an aspect of the invention.

FIG. 6 is a section view similar to FIG. 4 of a further pool fitting mounting arrangement according to an aspect of the invention.

FIG. 12 is a section view similar to FIG. 4 of a mounting arrangement according to another aspect of the invention.

FIG. 13 is a plan view of the mounting plate shown in FIG. 12.

FIG. 14 is a side elevation view of the mounting plate shown in FIG. 13.

FIG. 15 is a section view similar to FIG. 4 of a mounting arrangement according to another aspect of the invention.

FIG. 16 is a plan view of the mounting plate shown in FIG. 15.

FIG. 17 is a side elevation view of the mounting plate shown in FIG. 16.

DETAILED DESCRIPTION OF THE INVENTION

According to aspects of the invention, pool fitting mounting arrangements, methods of mounting pool fittings, and pool fitting mounting plates are provided. Aspects of the invention are characterized by mounting plates having projections that interact with projections on pool fittings and restrict the rotation of the fittings during installation to ensure a secure mounting in a desired orientation.

Figure 1:
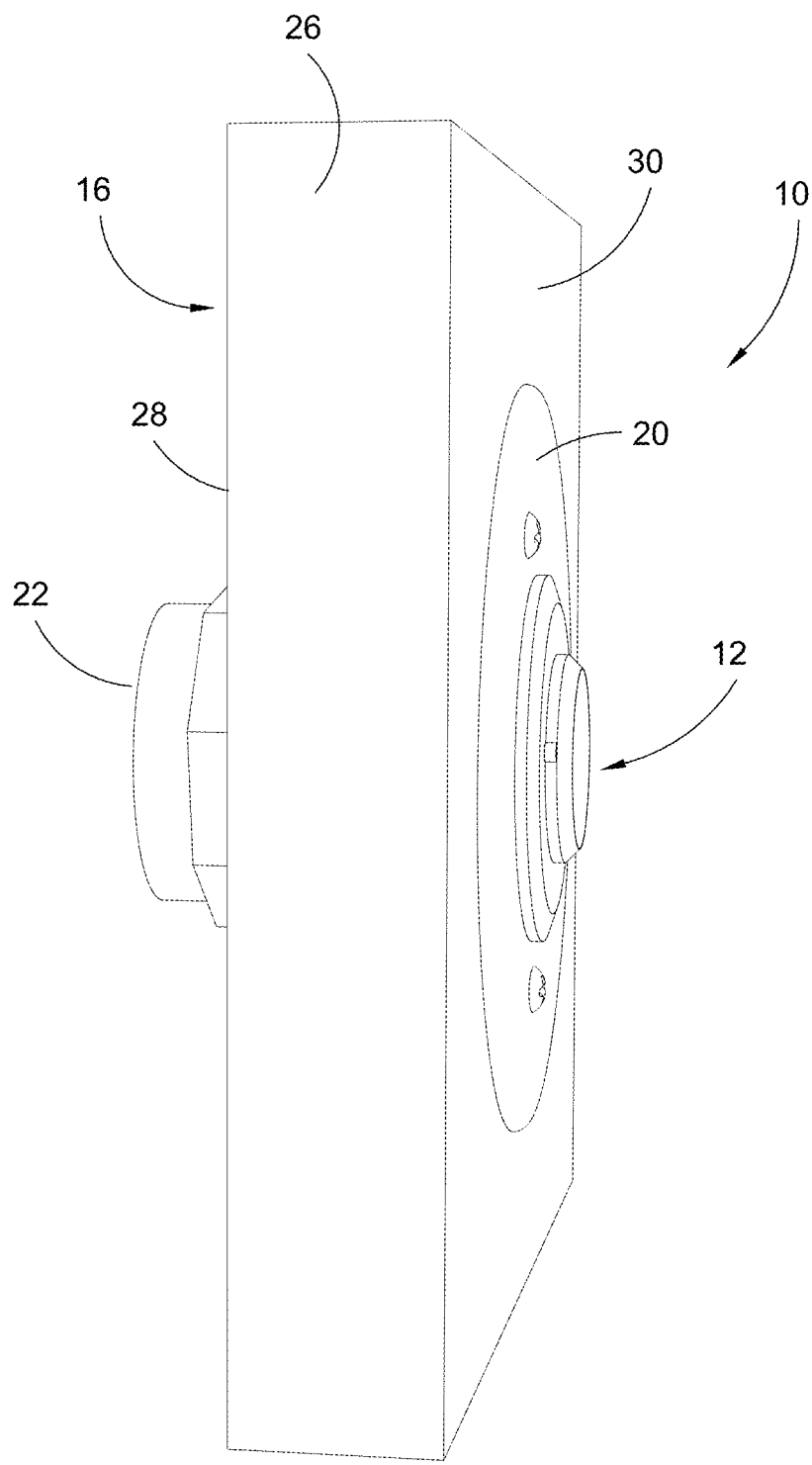
FIG. 1 is a perspective view of a pool fitting mounting arrangement according to the prior art.
Figure 2:
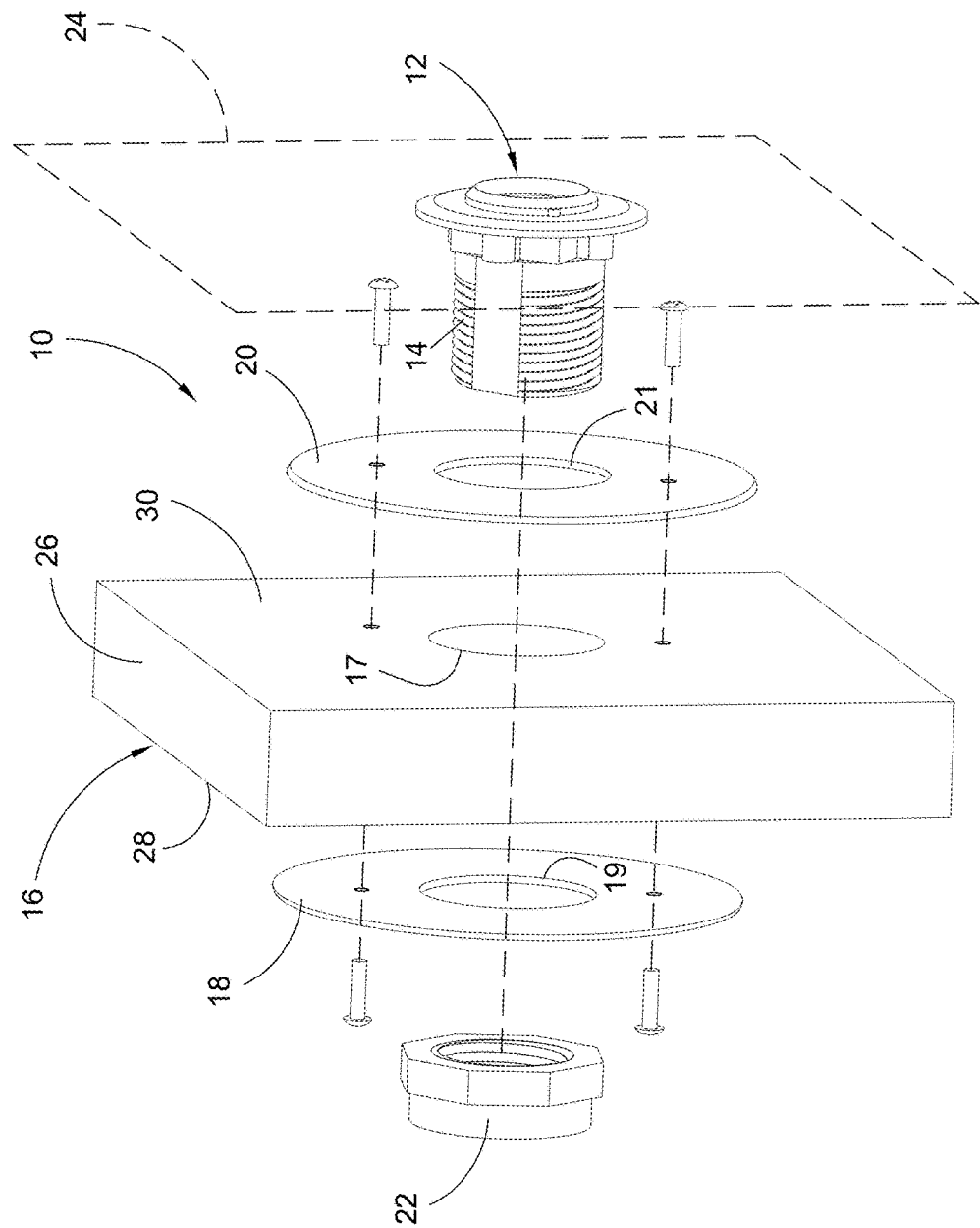
FIG. 2 is an exploded perspective view of the prior art pool fitting mounting arrangement shown in FIG. 1.

FIG. 1 is a perspective view of a pool fitting mounting arrangement 10 according to the prior art. FIG. 2 is an exploded perspective view of the prior art pool fitting mounting arrangement 10 shown in FIG. 1. As shown in FIGS. 1 and 2, a pool fitting 12, for example, a return nozzle, having an external threaded 14 may be mounted to pool wall panel 16 by means of mounting plate 18 having through holes 19, mounting plate 20 having through hole 21, and a internally threaded fastener or nut 22. In order to facilitate discussion of the prior art mounting arrangement 10, only a representative portion of a typical pool wall panel 16 is shown in FIG. 1. A typical pool liner 24, for example, a "vinyl pool liner 24, is omitted from FIG. 1 and is shown in phantom in FIG. 2.

As shown in FIGS. 1 and 2, the pool wall panel 16 to which mounting arrangement 10 may be mounted typically includes a through hole 17 extending through panel 16 and positioned as desired in panel 16. Pool wall panel 16 may be an insulated pool panel 16, for example, having internal insulation 26, and external panels or sheets 28 and 30, for example, aluminum or plastic panels mounted to internal insulation 26 with an adhesive.

According to the prior art, when fitting 12 is mounted to pool wall panel 16, mounting plates 18 and 20 may first be positioned about through hole 17 and then fitting 12 may be inserted through hole 21 in plate 20, through hole 17 in panel 16 and through hole 19 in panel 18 and then fitting 12 may be secured with threaded nut 22. As is typical of the prior art, with the engagement of nut 22 with the external threads 14 of fitting 12, nut 22 and fitting 12 are typically drawn together where corresponding opposing surfaces contact plates 18 and 20, respectively, to secure fitting 12 to pool panel 16.

However, field installation experience has shown that the tightening of nut 22 to fitting 12 may not firmly retain fitting 12 to wall panel 16 due to unhindered rotation of nut 22 and/or fitting 12 during the tightening of nut 22. For example, it is believed that in some instances friction between the mating surfaces of nut 22 and plate 18 and/or friction between the mating surfaces of fitting 12 and plate 20 may be insufficient to prevent the rotation of nut 22 with respect to panel 16 and/or the rotation of fitting 12 with respect to panel 16. In some instances, the unhindered rotation of nut 22 and/or fitting 12 may be insufficient to adequately mount, for example, rigidly mount, fitting 12 to panel 16. In other instances, the unhindered rotation of nut 22 and/or fitting 12 may interfere with the desired positioning or orientation of fitting 12, for example, where the rotation of nut 22 undesirably rotates fitting 12. Though attempts can be made, for example, repeated trial and error attempts, to properly mount and orient a fitting 12 within panel 16, aspects of the present invention can be provide effective means for minimizing or eliminating undesirable fitting rotation and accordingly facilitate fitting installation and maintenance.

Figure 3:
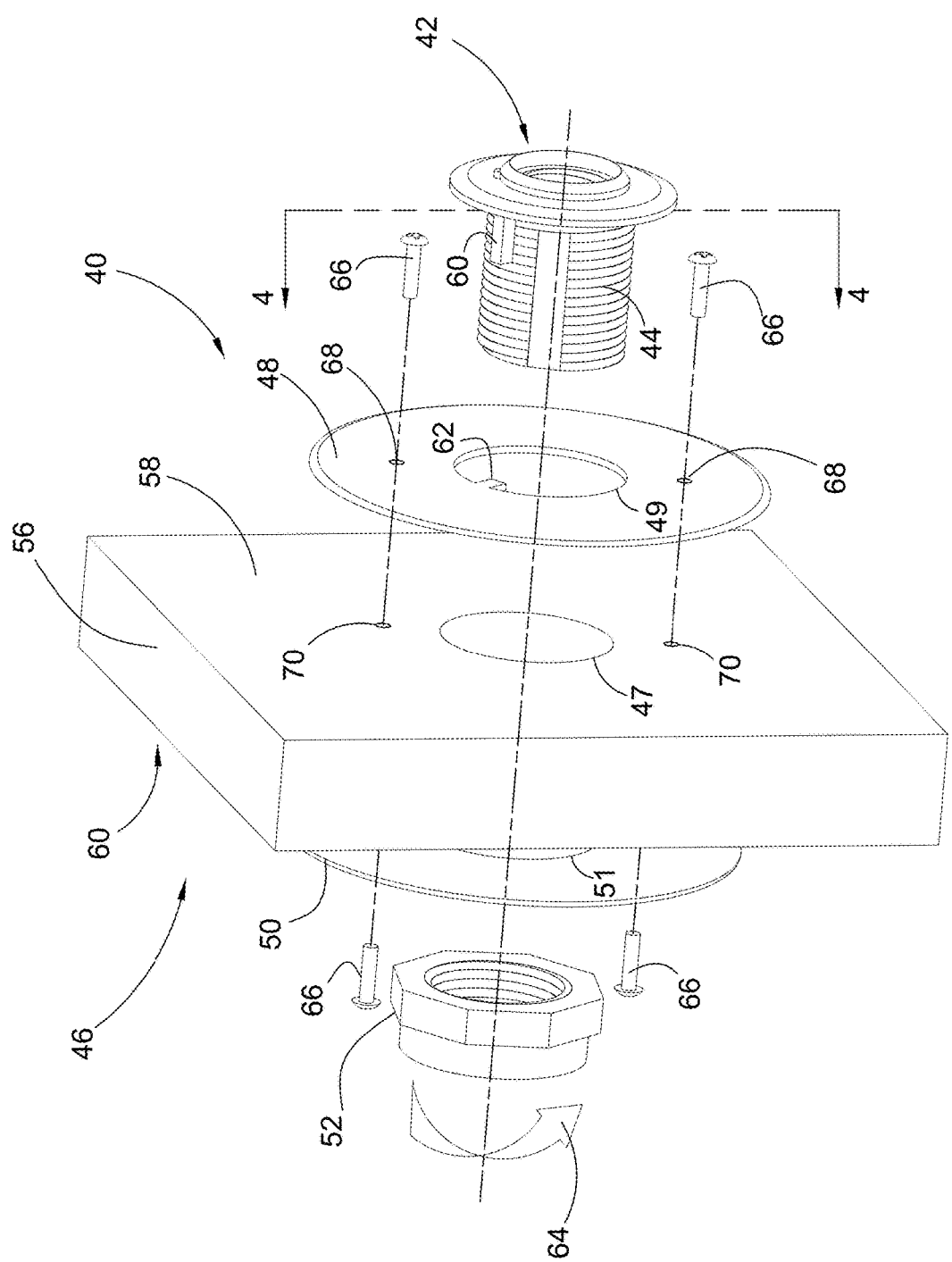
FIG. 3 is an exploded perspective view of a pool fitting mounting arrangement according to one aspect of the invention.

FIG. 3 is an exploded perspective view of a pool fitting mounting arrangement 40 according to one aspect of the invention. In a fashion similar to the mounting arrangement 10 shown in FIGS. 1 and 2, pool fitting mounting arrangement 40 may be adapted to mount a pool fitting 42, for example, a return fitting, having an external threaded 44 to a pool wall panel 46 by means of one or more mounting plates 48 having through hole 49, and/or one or more mounting plates 50 having through hole 51, and an internally threaded fastener or nut 52. Again, in order to facilitate discussion of this aspect of the invention, only a representative portion of a typical pool wall panel 46 is shown in FIG. 3. A typical pool liner that may be present is omitted from FIG. 3.

In the following discussion, fitting 42 and related fittings that may be mounted by the arrangements and methods disclosed herein may be referred to as a "return fitting" to facilitate disclosure of the many aspects and features of the invention. However, it is envisioned that aspects of the invention may apply to mounting arrangements and methods of mounting for any structure that penetrates a pool wall. This includes, but is not limited to, light fixtures, inlets, outlets, ports, sight glasses, and valves, among other structures.

According to aspects of the invention, fitting 42 includes one or more projections or recesses 60 and mounting plate 48 includes one or more corresponding projections or recesses 62 positioned and adapted to engage the one or more projections or recesses 60 on fitting 42 to minimize or prevent relative rotation of fitting 42 with respect to mounting plate 48. In one aspect, as shown more clearly in FIG. 4, this prevention of relative rotation of fitting 42 with respect to mounting plate 48 minimizes, restricts, and/or prevents rotation of fitting 42 with the rotation of nut 52 to facilitate the mounting of fitting 42 to panel 46. In one aspect, the projections or recesses 60 on fitting 42 may be radially directed, for example, having an axis directed away from the centerline of fitting 42. In one aspect, the projections or recesses 62 on plate 48 may be radially directed, for example, having an axis directed toward the centerline of plate 48.

As shown in FIG. 3, in one aspect, the pool wall panel 46 to which mounting arrangement 40 may be mounted includes a through hole 47 extending through panel 46 and positioned as desired in panel 46. Pool wall panel 46 may be an insulated pool panel, for example, having internal insulation 56, for example, an expanded polystyrene foam insulation provided by Shelter Enterprises Inc. of Cohoes, New York, though other types of insulation may be used, and external panels or sheets 58 and 60, for example, acrylic coated aluminum or plastic panels mounted to internal insulation 56 with an adhesive.

One typical insulated pool wall to which mounting arrangement 40, and other mounting arrangements disclosed herein, may be mounted to is the insulated pool panel offered by Trojan Leisure Products, LLC (doing business as "Radiant Pools") of Albany, N.Y. A typical construction of a Radiant Pools panel is disclosed in U.S. Patent Publication 2008/0104745 of Beaudoin, et al. and in U.S. Pat. No. 10,244,490 of Foster, et al. (both of which are included by reference herein).

Pool panel 56 may have a thickness from about 0.5 inches to about 6 inches, but may typically have a thickness between 1.5 inches to 2.5 inches, for example, 2 inches. Panels or sheets 58 and 60 may have a thickness between about 0.001 inches to about 0.125 inches, but may typically have a thickness between 0.010 inches to 0.045 inches, for example, 0.024 inches.

In the following discussion, recesses and/or projections from fitting 42 and related fittings may be described as engaging recesses and/or projections on mounting plate 48, that is, a mounting plate located internal to pool wall 46. However, it is envisioned that recesses and/or projections from fitting 42 and related fittings may also engage recesses and/or projections on mounting plate 5o that is, a mounting plate located external to pool wall 46. In one aspect, recesses and/or projections from fitting 42 and related fittings may also engage recesses or projections on both mounting plate 48 and on mounting plate 50. In short, any features of mounting plate 48 and related mounting plates are envisioned to also apply to mounting plate 50 and related mounting plates.

Figure 4:
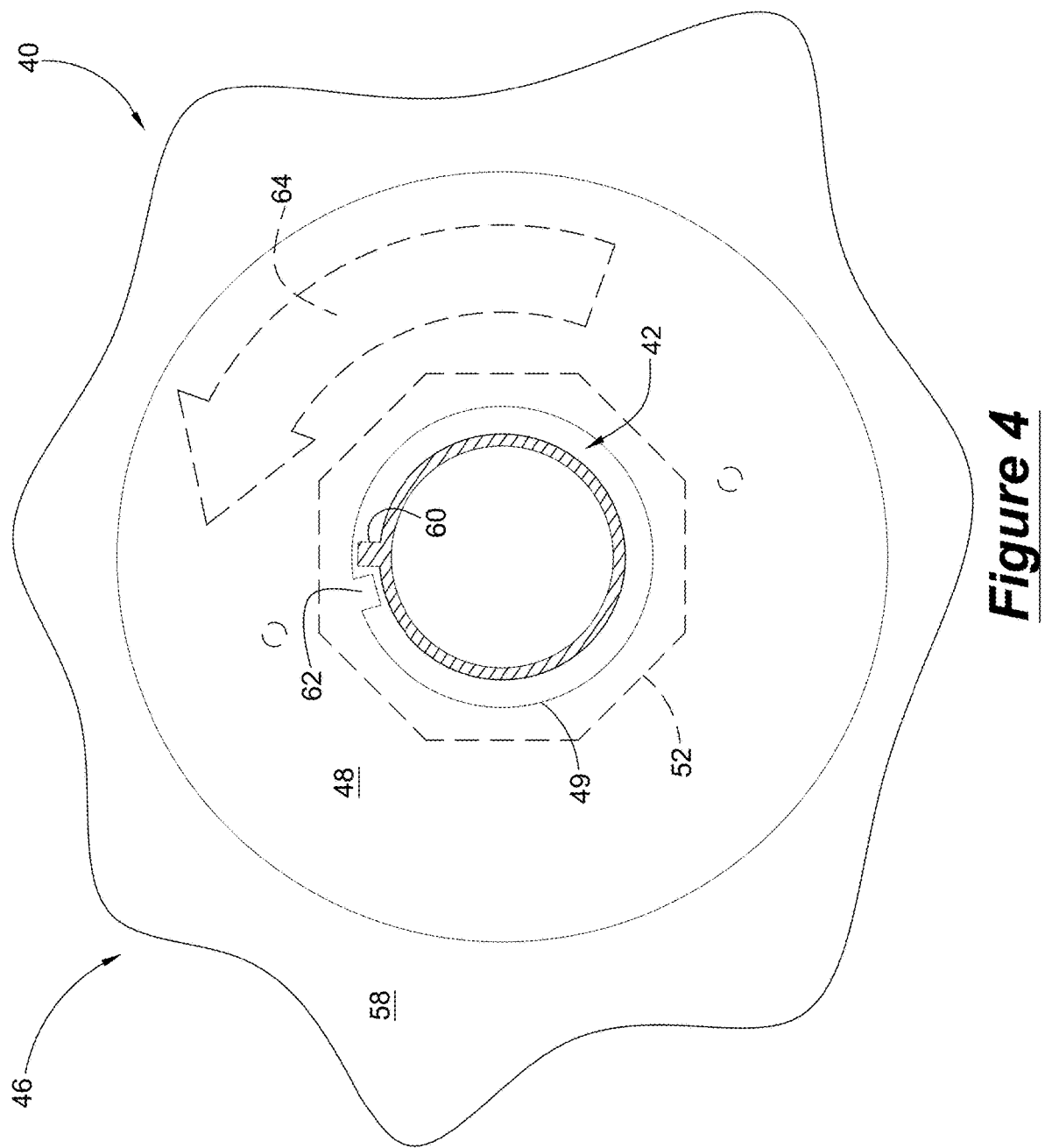
FIG. 4 is a section view of the pool fitting mounting arrangement shown in FIG. 3 as viewed along section lines 4-4 shown in FIG. 3.

FIG. 4 is a section view of the pool fitting mounting arrangement 40 shown in FIG. 3 as viewed along section lines 4-4 shown in FIG. 3. As shown in FIG. 4, with the rotation, for example, tightening, of nut 52—as indicated by curved arrow 64 in FIGS. 3 and 4— though fitting 42 may rotate due to engagement and friction with rotating nut 52, contact between projection 60 on fitting 42 with projection 62 on mounting plate 48 can, according to aspects of the invention, prevent rotation of fitting 42 with respect to mounting plate 48.

In one aspect, mounting plate 48 may be mounted or fixed to panel 46, for example, by means of one or more mechanical fasteners or an adhesive, to further prevent rotation of fitting 42 with respect to panel 46. For example, as shown in FIG. 3, mounting plate 48 and/or mounting plate 50 may be mounted to pool panel 46 by means of one or more fasteners 66, for example, threaded screws, to minimize or prevent rotation of mounting plate 48 and/or mounting plate 50 with respect to panel 46. As shown in FIG. 3, mounting plate 48 and/or mounting plate 50 may be provided with one or more through holes 68 (present but not shown for mounting plate 50 in FIG. 3) positioned and adapted to receive fasteners 66. In one aspect, pool panel 46 may be provided with one or more blind holes 70, for example, blind holes, positioned and adapted to receive fasteners 66 (present but not shown for hidden side of panel 46 in FIG. 3). In one aspect, fasteners 66 may be self-tapping, and holes 68 in mounting plates 48 and 50 and/or holes 70 in panel 46 may be omitted.

FIG. 5 is a section view similar to FIG. 4 of another pool fitting mounting arrangement 80 according to an aspect of the invention. Mounting arrangement 80 may be similar in many aspects to mounting arrangement 40 shown in FIGS. 3 and 4; however, mounting arrangement 80 includes two or more projections or recesses 60 on fitting 42 and two or more corresponding projections or recesses 62 on mounting plate 48.

FIG. 6 is a section view similar to FIG. 4 of another pool fitting mounting arrangement 90 according to an aspect of the invention. Mounting arrangement 90 may be similar in many aspects to mounting arrangement 40 shown in FIGS. 3 and 4; however, mounting arrangement 90 includes three or more projections or recesses 60 on fitting 42 and three or more corresponding projections or recesses 62 on mounting plate 48.

In one aspect, the mounting arrangement 90 may include 4 or more, 6 or more, 8 or more or 10 or more projections or recesses 60 on fitting 42 and a corresponding number of projections or recesses 62 on mounting plate 48.

Figure 7:
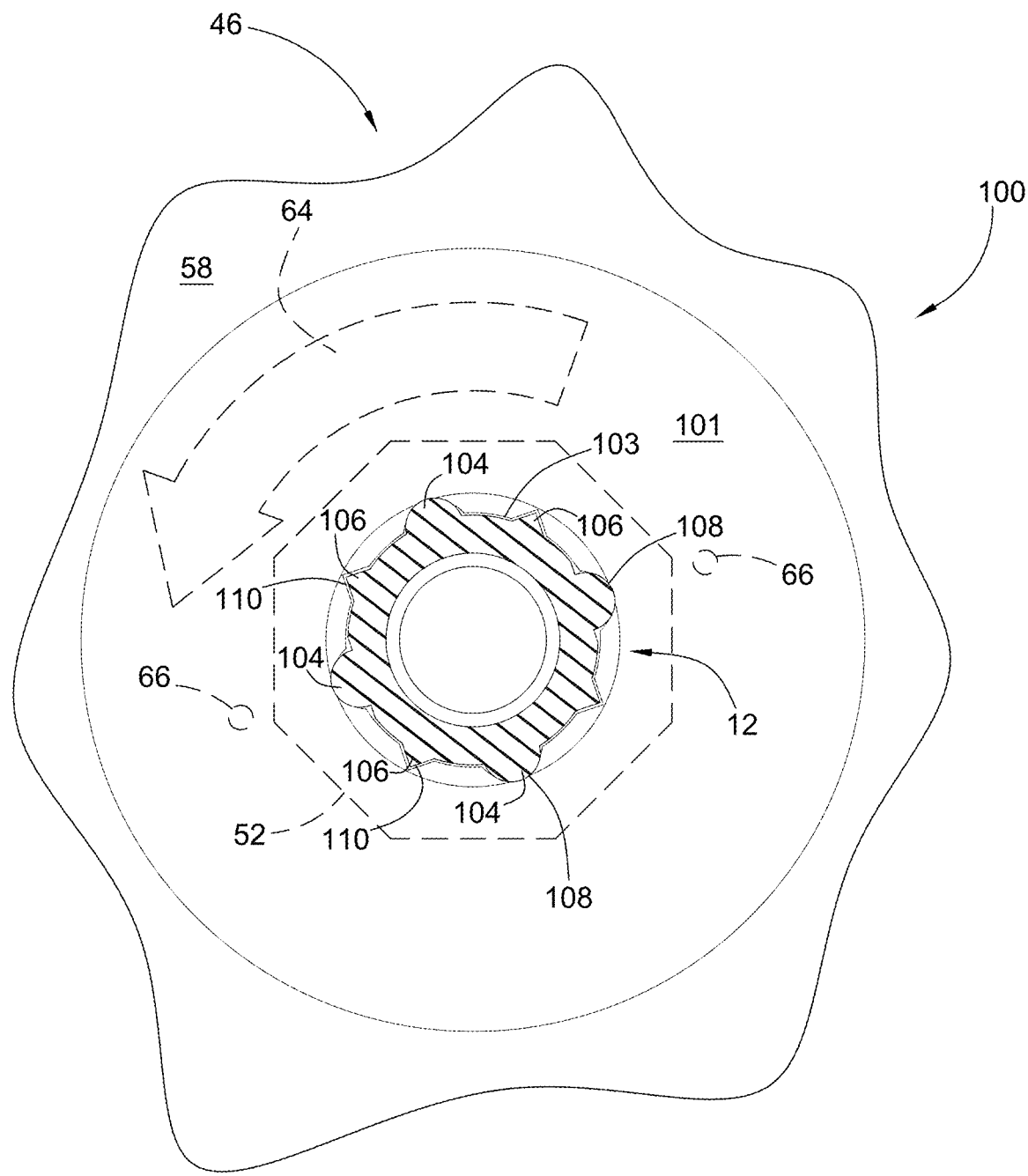
FIG. 7 is a section view similar to FIG. 4 of a still further pool fitting mounting arrangement according to an aspect of the invention.

FIG. 7 is a section view similar to FIG. 4 of a still further pool fitting mounting arrangement 100 according to aspect of the invention. Mounting arrangement 100 may be similar in many aspects to mounting arrangements 40, 80, and 90 shown in FIGS. 3 through 6, for example, having one or mounting plates 101 having a hole 103 mounted to panel 46. However, according to this aspect of the invention, mounting arrangement 100 is uniquely adapted to accommodate the prior art fitting 12 shown in FIG. 2, or a similar fitting. For instance, fitting 12 may be similar in shape to a fitting provided by Radiant Pools of Albany, N.Y. For example, fitting 12 may be a Radiant Inlet Fitting having a model number 3081.

As shown and FIG. 2 and represented by the cross section of fitting 12 shown in FIG. 7, fitting 12 may include a hollow, circular cylindrical body 102, four semicircular projections 104 from the circular cylindrical body 102, and four triangular projections 106 from the circular cylindrical body 102. For example, the semicircular projections 104 may comprises bosses molded into fitting 12 adjacent the mounting flange and located and sized to receive faceplate mounting screws, and the triangular projections 106 may comprise four corners of a square spacer molded into fitting 12 adjacent the mounting flange of fitting 12.

According to aspects of the invention, any one or more of projections 104 and 106 may engage one or more recesses along the insider surface of the penetration or hole 103 in mounting plate 101. For example, as shown in FIG. 7, mounting plate 101 may include one or more semicircular recesses 108 shaped and positioned to engage one or more semicircular projections 104, and/or one or more triangular recesses 110 shaped and positioned to engage one or more triangular projections 106. According to aspects of the invention, contact between one or more projections 104 and/or 106 and one or more recesses 108 and/or no can prevent the rotation of fitting 12 when nut 52 is tightened, as indicted by arrow 64 in FIG. 7. As also shown in FIG. 7, in one aspect, mounting plate 101 may be secured to pool panel 46 by one or more fasteners 66.

Figure 9:
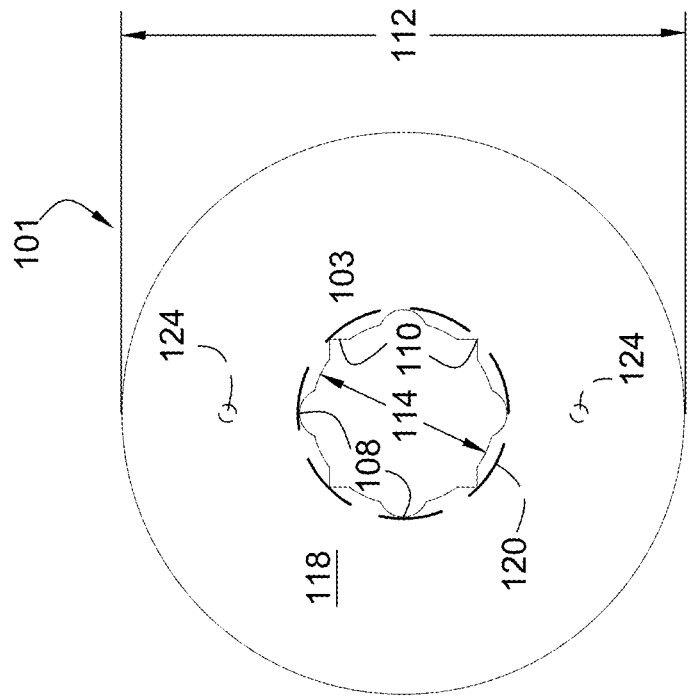
FIG. 9 is a rear plan view of the mounting plate shown in FIG. 8.
Figure 10:
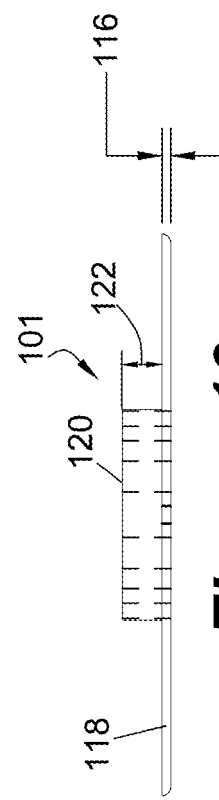
FIG. 10 is a side elevation view of the mounting plate shown in FIG. 8.
Figure 8:
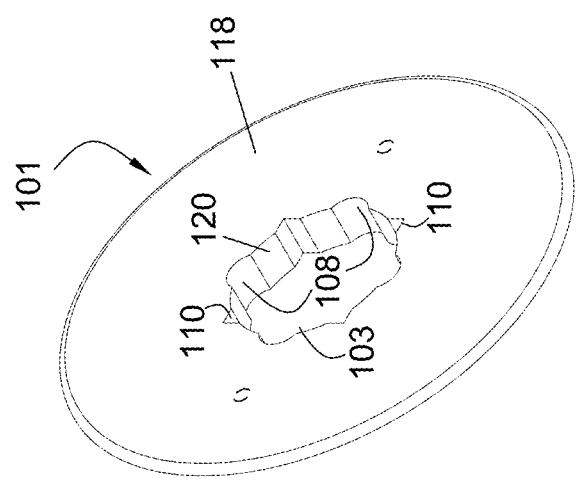
FIG. 8 is a rear perspective view of the mounting plate shown in FIG. 7.
Figure 11:
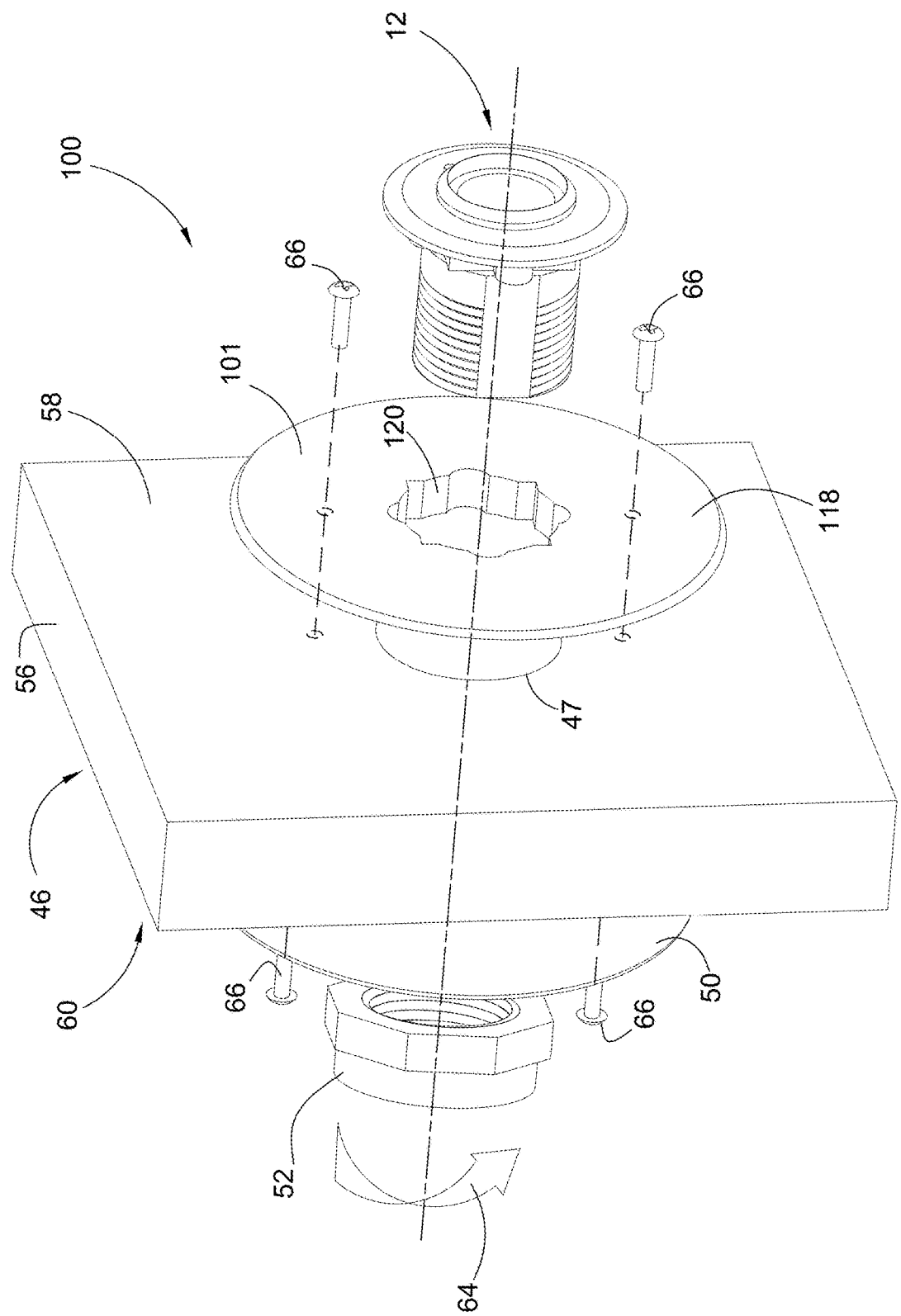
FIG. 11 is an exploded perspective view of the pool fitting mounting arrangement shown in FIG. 7 according to an aspect of the invention.

FIG. 8 is a rear perspective view of mounting plate 101 shown in FIG. 7. FIG. 9 is a rear plan view of mounting plate 101 and FIG. 10 is a side elevation view of mounting plate 101 shown in FIG. 8. FIG. 11 is an exploded perspective view of the pool fitting mounting arrangement 100 shown in FIG. 7 having fitting 12 and mounting plate 101 according to one aspect of the invention.

As shown in FIG. 11, mounting arrangement 100 having mounting plate 101 may be used to install a fitting 12 into an insulated pool wall panel 46 having internal foam installation 56 and external sheeting or panels 58 and 60 as disclosed herein. As is typical of the aspects of the invention disclosed herein, pool wall panel 46 includes a through hole 47 adapted and positioned to receive fitting 12 or its equivalent.

As shown in FIGS. 8 through 10, mounting plate 101 may comprise a substantially circular disk 118 having an outside dimension (or diameter) 112, and inside dimension (or diameter) 114, and a thickness 116. As discussed with respect to FIG. 7, mounting plate 101 may include one or more semicircular recesses 108 shaped and positioned to engage one or more semicircular projections 104, and/or one or more triangular recesses 110 shaped and positioned to engage one or more triangular projections 106. It is envisioned that, though recesses 108 and no may be semicircular or triangular, respectively, in other aspects, recesses 108 and no may be ellipsoidal, semi-ellipsoidal, polygonal (such as, square, rectangular or hexagonal) and provide the desired contact and restriction to rotation to corresponding projections on a fitting 12. It is also envisioned that the corresponding projections on the fitting 12 may be similarly shaped, for example, a semicircular projection engaging a semicircular recess, or may differ in shape, for example, a rectangular projection engaging a semicircular recess. Other shaped recesses and projections that can be provided while providing the desired restriction to rotation will be apparent to those of skill in the art.

In one aspect of the invention, mounting plate 101 may be substantially uniform in thickness 116, that is, devoid of any projections or bosses from the generally uniform thickness. Thickness 1116 may range from 0.0625 inches to 0.5 inches, but may typically between 0.0625 inches to 0.25 inches, for example, about 0.125 inches.

However, in other aspects of the invention, mounting plate 101 may include one or more rings, bosses, or reinforcements 120 about the inside penetration or hole 103 of disk 118. The recesses 108 and/or no may be distributed about the inside surface of hole 103 or about the inside surface of ring or boss 120. Ring or boss 120 may be provided to enhance the structural integrity of mounting plate 101 and/or to increase the contact surface of recesses 108 and/or 110 to enhance the resistance to rotation of the fitting, for example, of fitting 12.

As shown in FIG. 10, ring or boss 120 may have a height 122. Height 122 may range from 0.0625 inches to 3 inches, but may typically between 0.25 inches to 0.75 inches, for example, about 0.5 inches.

Mounting plate 101 may be made from a plastic, a metal, or even a wood. For example, a plastic mounting plate 101 may be made of a polyamide (PA), for example, nylon; a polyethylene (PE), both high-density polyethylene (HDPE) and low-density polyethylene (LDPE); a polyethylene terephthalate (PET); a polypropylene (PP); a polyester (PE); a polytetrafluoroethylene (PTFE); a polystyrene (PS); an acrylonitrile butadiene styrene (ABS); a polycarbonate (PC); or a polyvinylchloride (PVC); among other plastics. A metallic mounting plate 100 may be made form steel, stainless steel, aluminum, titanium, or any other structural metal. In one aspect, mounting plate 101 may be made of a polyvinylchloride (PVC) plastic.

Though mounting plate 101 is illustrated in FIGS. 8 through 11 as a generally circular plate, mounting plate 101 may be provided in any suitable shape. Accordingly, it is envisioned that mounting plate 101 may have an elliptical shape or a polygonal shape, for example, triangular, quadrilateral, hexagonal, or octagonal shape, among others. In one aspect, mounting plate 101 may include one or more through holes 124 positioned and sized to receive mounting fasteners, such as, screws 66 (See FIG. 11). In one aspect, the outer edge of mounting plate 101 may be chamfered or radiused to provide a smooth transition from the mating pool wall 46.

FIG. 12 is a section view similar to FIG. 4 of a mounting arrangement 130 according to another aspect of the invention. As shown in FIG. 12, mounting arrangement 130 includes a mounting plate 132 positioned on panel 46 and engaging the fitting 12 shown in FIG. 11, or a similar fitting. As discussed above with respect to FIG. 7, according to aspects of the invention, fitting 12 may include a hollow, circular cylindrical body 102, one or more semicircular projections 104 from the circular cylindrical body 102, and one or more triangular projections 106 from the circular cylindrical body 102. As noted above, projections 104 and/or 106 may also comprise different shapes, for example, instead of semicircular or triangular. In one aspect, mounting plate 132 may be mounted or fixed to panel 46, for example, by means of one or more mechanical fasteners or an adhesive, to further prevent rotation of fitting 12 with respect to panel 46

According to the aspect of the invention shown in FIG. 12, plate 132 incudes at least one recess 134 positioned and adapted to receive one or more of the projections 104 and/or 106 and restrict rotation of fitting 12.

FIG. 13 is a plan view of mounting plate 132 shown in FIG. 12 and FIG. 14 is a side elevation view of mounting plate 132 shown in FIG. 13.

As shown in FIGS. 12 through 14, mounting plate 132 may comprise a disk 136 having an opening or hole 138 sized to receive fitting 12 and at least one recess 134, for example, a semicircular recess, though two recesses 134 are shown in FIGS. 12 and 13. As shown, in one aspect, recesses 134 may be positioned in linear or flat areas 140 in opening 138, for example, to allow the recesses 134 to engage projections 104. Plate 132 may have one or more of the attributes of plate 101 disclosed herein, for example, plate 132 may have a ring or boss about the opening 138, may have a thickness of about 0.125 inches, may have one or more through holes for fasteners, and may be made of a plastic.

Though mounting plate 132 is illustrated in FIGS. 12 through 14 as a generally circular plate, mounting plate 132 may be provided in any suitable shape. Accordingly, it is envisioned that mounting plate 132 may have an elliptical shape or a polygonal shape, for example, triangular, quadrilateral, hexagonal, or octagonal shape, among others.

FIG. 15 is a section view similar to FIG. 4 of a mounting arrangement 150 according to another aspect of the invention. As shown in FIG. 15, mounting arrangement 150 includes a mounting plate 152 having positioned on panel 46 and engaging the fitting 12 shown in FIG. 11, or a similar fitting. As discussed above with respect to FIG. 7, according to aspects of the invention, fitting 12 may include a hollow, circular cylindrical body 102, one or more semicircular projections 104 from the circular cylindrical body 102, and one or more triangular projections 106 from the circular cylindrical body 102. As noted above, projections 104 and/or 106 may also comprise different shapes, for example, instead of semicircular or triangular. In one aspect, mounting plate 152 may be mounted or fixed to panel 46, for example, by means of one or more mechanical fasteners or an adhesive, to further prevent rotation of fitting 12 with respect to panel 46

According to the aspect of the invention shown in FIG. 15, plate 152 incudes at least one recess 154 positioned and adapted to receive one or more of the projections 104 and/or 106 and restrict rotation of fitting 12. FIG. 16 is a plan view of mounting plate 152 shown in FIG. 15 and FIG. 17 is a side elevation view of mounting plate 152 shown in FIG. 15.

As shown in FIGS. 16 and 17, mounting plate 152 comprises a disk 156 having an opening or hole 158 sized to receive fitting 12 and at least one recess 154, for example, triangular recesses, though two recesses 154 are shown in FIGS. 15 and 16. As shown, in one aspect, recesses 154 may be positioned in linear or flat areas 160 in opening 158, for example, to allow the recesses 154 to engage projections 106. Plate 152 may have one or more of the attributes of plate 101 disclosed herein, for example, plate 152 may have a ring or boss about the opening 158, may have a thickness of about 0.125 inches, may have one or more through holes for fasteners, and may be made of a plastic.

Though mounting plate 152 is illustrated in FIGS. 15 through 17 as a generally circular plate, mounting plate 152 may be provided in any suitable shape. Accordingly, it is envisioned that mounting plate 152 may have an elliptical shape or a polygonal shape, for example, triangular, quadrilateral, hexagonal, or octagonal shape, among others.

As described herein, the fitting mounted by aspects of the invention, for example, fitting 12 shown in FIG. 11, may have been described as a "return fitting," that is, an inlet to a pool through which return flow from, for example, a filter system, may be reintroduced to the pool. However, it is envisioned that any fitting or structure that can be mounted to a pool wall may be enhanced by aspects of the invention. For example, in one aspect, the mounting arrangements and methods for mounting disclosed herein include arrangements and methods for mounting a light fixture; arrangements and methods for mounting an inlet or an outlet; arrangements and methods for mounting a nozzle; arrangements and methods for mounting a port, for example, a hose port, such as, a vacuum port; arrangements and methods for mounting a skimmer assembly; arrangements and methods for mounting a sight glass; arrangements and methods for mounting a drain; and arrangements and methods for mounting a valve, for example, a check valve, among other structures or fittings.

As disclosed herein, embodiments of the invention, in their many aspects, provide mounting arrangements, mounting methods, and mounting plates for mounting fittings, such as, return fittings, to pool walls, for example, insulated pool walls. Aspects of the invention may be adapted for use in any pool or other water retaining structure, for example, for a spa or a water feature, and facilitate installation of the fitting. Aspects of the invention may be uniquely adapted for mounting or installing fittings to insulated pool panels, but aspects of the invention may be adapted for use in mounting fittings in any pool wall, including inground, above ground, and partially above ground pools. In addition to residential pool or resort pool use, aspects of the invention may also be used in commercial and/or industrial liquid container applications where the mounting arrangements and methods may be beneficial.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While several aspects of the present invention have been described and depicted herein, alternative aspects may be affected by those skilled in the art to accomplish the same objectives. Accordingly, it is intended by the appended claims to cover all such alternative aspects as fall within the true spirit and scope of the invention.

The invention claimed is:

1. A mounting arrangement for a pool fitting, the mounting arrangement comprising:
   a pool fitting adapted to penetrate a wall of a pool, the pool fitting having a cylindrical body having an external thread, a proximal end having a mounting flange having an outside dimension greater than an outside dimension of the cylindrical body, at least one projection from the cylindrical body, and a distal end providing access to the external thread on the cylindrical body;
   a mounting plate having a through hole sized and positioned to receive the cylindrical body of the pool fitting and at least one projection or recess adapted to engage the at least one projection from the cylindrical body; and
   an internally threaded nut adapted to engage the external threads of the distal end of the cylindrical body;
   wherein contact between the at least one projection on the cylindrical body of the fitting with the at least one projection or recess of the mounting plate restricts rotation of the pool fitting with respect to the mounting plate.

2. The mounting arrangement as recited in claim 1, wherein the pool fitting comprises one of a nozzle, a light fixture, an inlet, and an outlet.

3. The arrangement as recited in claim 2, wherein the pool fitting comprises a nozzle and wherein the nozzle comprises a return fitting.

4. The arrangement as recited in claim 1, wherein the at least one projection from the cylindrical body of the fitting is positioned adjacent the mounting flange of the fitting.

5. The arrangement as recited in claim 1, wherein contact between the at least one projection on the cylindrical body of the fitting with the at least one projection or recess of the mounting plate prevents rotation of the pool fitting with respect to the mounting plate.

6. The arrangement as recited in claim 1, wherein the cylindrical body comprises a circular cylindrical body.

7. The arrangement as recited in claim 1, wherein the pool wall comprises an insulated pool wall.

8. The arrangement as recited in claim 7, wherein the insulated pool wall comprises a pool wall having opposing external sheeting and an internal insulating foam.

9. The arrangement as recited in claim 1, wherein the arrangement further comprises at least one fastener adapted to retain the mounting plate to the pool wall.

10. The arrangement as recited in claim 1, wherein the mounting plate comprises an internal mounting plate, and wherein the arrangement further comprises an external mounting plate having a through hole sized and positioned to receive the cylindrical body of the pool fitting.

11. A pool fitting mounting device comprising a plate having a threadless through hole sized and positioned to receive a cylindrical body of a pool fitting, the plate having at least one projection or recess adapted to engage at least one projection from the cylindrical body and prevent rotation of the pool fitting with respect to the plate.

12. The pool fitting mounting device as recited in claim 11, wherein the at least one projection or recess comprises at least one radially-directed projection or recess.

13. The pool fitting mounting device as recited in claim 11, wherein the plate comprises a circular plate.

14. The pool fitting mounting device as recited in claim 11, wherein the at least one projection or recess comprises a plurality of projections or recesses.

15. The pool fitting mounting device as recited in claim 11, wherein the pool fitting comprises a return fitting.

16. A method for mounting a fitting to a pool wall having a through hole, the method comprising:
   positioning a mounting plate about the through hole in the pool wall, the mounting plate having a through hole sized and positioned to receive a cylindrical body of a pool fitting, the through hole in the mounting plate having at least one projection or recess;
   inserting a cylindrical body of a pool fitting through the through hole in the mounting plate and through the through hole in the pool wall, the cylindrical body having an external thread, a proximal end having a mounting flange having an outside dimension greater than an outside dimension of the through hole in the mounting plate, and at least one projection from the cylindrical body;
   mounting an internally threaded nut to the external thread of the cylindrical body of the fitting and rotating and advancing the nut toward the pool wall; and
   while advancing the nut, contacting the at least one projection from the cylindrical body of the fitting with the at least one projection or recess from the mounting plate to restrict rotation of the fitting with respect to the mounting plate.

17. The method as recited in claim 16, wherein positioning the mounting plate comprises securing the mounting plate to the pool wall with at least one mechanical fastener or an adhesive.

18. The method as recited in claim 16, wherein contacting the at least one projection from the cylindrical body of the fitting with the at least one projection or recess from the mounting plate comprises preventing rotation of the fitting with respect to the mounting plate.

19. The method as recited in claim 16, wherein the fitting comprises one of a return fitting, a light fixture, an outlet, and an inlet.

20. The method as recited in claim 16, wherein the pool wall comprises an insulated pool having internal foam insulation and external sheeting.

21. The mounting arrangement as recited in claim 1, wherein the mounting plate further comprise a reinforcing boss about the at least one projection or recess.

22. The pool fitting mounting device as recited in claim 11, wherein the comprising the plate further comprise a reinforcing boss about the at least one projection or recess.

23. The method as recited in claim 16, wherein the method further comprises reinforcing the at least one projection or recess on the mounting plate with a reinforcing boss about the at least one projection or recess.

* * * * *